United States Patent
Dunn et al.

(10) Patent No.: US 9,678,730 B2
(45) Date of Patent: *Jun. 13, 2017

(54) DECISION TREE ENSEMBLE COMPILATION

(71) Applicant: Facebook, Inc., Menlo Park, CA (US)

(72) Inventors: Jeffrey S. Dunn, Seattle, WA (US); Rafael L. Sagula, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,005

(22) Filed: Jun. 15, 2015

(65) Prior Publication Data

US 2015/0277878 A1    Oct. 1, 2015

Related U.S. Application Data

(63) Continuation of application No. 14/511,628, filed on Oct. 10, 2014, now Pat. No. 9,116,720, which is a continuation of application No. 13/626,340, filed on Sep. 25, 2012, now Pat. No. 8,918,771.

(51) Int. Cl.
*G06F 9/45* (2006.01)
*G06F 9/455* (2006.01)

(52) U.S. Cl.
CPC ............ *G06F 8/443* (2013.01); *G06F 8/41* (2013.01); *G06F 9/45516* (2013.01)

(58) Field of Classification Search
CPC ......... G06F 8/41; G06F 8/443; G06F 8/45516
USPC .................... 717/140, 148, 151, 152, 153
See application file for complete search history.

(56) References Cited

U.S. PATENT DOCUMENTS

| | | | | |
|---|---|---|---|---|
| 5,633,948 A * | 5/1997 | Kegelmeyer, Jr. | ... | G06K 9/6282 382/132 |
| 6,101,275 A * | 8/2000 | Coppersmith | ....... | G06K 9/6282 382/226 |
| 2009/0019431 A1 * | 1/2009 | George | .................. | G06F 8/445 717/151 |
| 2009/0138389 A1 * | 5/2009 | Barthel | .................. | G06Q 10/10 705/31 |
| 2009/0217248 A1 * | 8/2009 | Bently | ...................... | G06F 8/30 717/132 |
| 2010/0094800 A1 * | 4/2010 | Sharp | .................. | G06N 99/005 706/55 |
| 2013/0080114 A1 * | 3/2013 | Stergiou | .................. | G06N 5/02 702/176 |

(Continued)

FOREIGN PATENT DOCUMENTS

EP     WO 2007/099484 A2 *    9/2007    ............... G06F 9/45

OTHER PUBLICATIONS

Krishnamoorthy et al., "Static Detection of Disassebly Errors", 2009.*

(Continued)

*Primary Examiner* — Phillip H Nguyen
(74) *Attorney, Agent, or Firm* — Baker Botts L.L.P.

(57) ABSTRACT

In one embodiment, a decision tree is evaluated in interpreted mode while statistics are collected. The decision tree is then represented as source code, and each decision in the decision tree is annotated with instructions determined based on the collected statistics. The source code is compiled into machine code, and the machine code is optimized based on the instructions annotating each decision in the decision tree.

33 Claims, 6 Drawing Sheets

(56) References Cited

U.S. PATENT DOCUMENTS

2013/0204834 A1* 8/2013 Forsee, II ............ H04M 3/493
　　　　　　　　　　　　　　　　　　　　706/52

OTHER PUBLICATIONS

Corston-Oliver et al., "Combining decision trees and transformation-based learning to correct transferred linguistic representations", 2003.*

* cited by examiner

US 9,678,730 B2

DECISION TREE ENSEMBLE COMPILATION

PRIORITY

This application is a continuation under 35 U.S.C. §120 of U.S. patent application Ser. No. 14/511,628, filed 10 Oct. 2014, which is a continuation of U.S. patent application Ser. No. 13/626,340, filed 25 Sep. 2012, both of which are incorporated herein by reference.

TECHNICAL FIELD

This disclosure generally relates to data structure processing and more specifically relates to compiling a decision tree ensemble that consists of a collection of decision trees.

BACKGROUND

A decision tree is a decision support tool that uses a tree-like graph to model decisions and their possible consequences, such as chance event outcomes, resource costs, and utility. A decision tree ensemble (e.g., random forest) consists of a collection of decision trees. More specifically, in machine learning and statistics, a decision tree ensemble is an ensemble classifier that outputs the class that is the mode of the classes output by the individual decisions trees.

SUMMARY OF PARTICULAR EMBODIMENTS

In particular embodiments, a decision tree ensemble (e.g., random forest) consists of a collection of decision trees. A decision tree may include three types of nodes: decision nodes, chance nodes, and end nodes. End nodes may also be referred to as leaf nodes. In machine learning, a decision tree may be used to implement a non-linear machine learning model that models a classification or regression problem as a series of binary decisions based on its input features and leading to a final result stored in the leaf nodes.

In particular embodiments, a decision tree may be represented as computer software (e.g., a function or a procedure), and using (e.g., evaluating) the decision tree involves executing the corresponding software program.

In some embodiments, a decision tree may be translated into machine code suitable for execution on computing systems statically. In this case, before the decision tree needs to be used, it is first represented as source code using a suitable programming language. The source code is then compiled into machine code (e.g., as a shared library). The machine code is distributed to various computing systems for execution as needed.

Alternatively, in other embodiments, a decision tree may be translated into machine code dynamically, at the time the tree is used. This may be referred to as "just-in-time" compilation. In this case, the decision tree itself is distributed to various computing systems. At each computing system, at first, the decision tree is evaluated in interpreted mode while statistics are collected. Source code representing the decision tree may then be generated and compiled into machine code. The machine code may be executed, replacing the evaluation of the decision tree in interpreted mode.

DESCRIPTION OF EXAMPLE EMBODIMENTS

A decision tree ensemble (e.g., random forest), which consists of a collection of decision trees, may be a part of a computer-implemented searching tool and used for ranking search results. Such a searching tool may be provided by a social-networking system.

Figure 1:
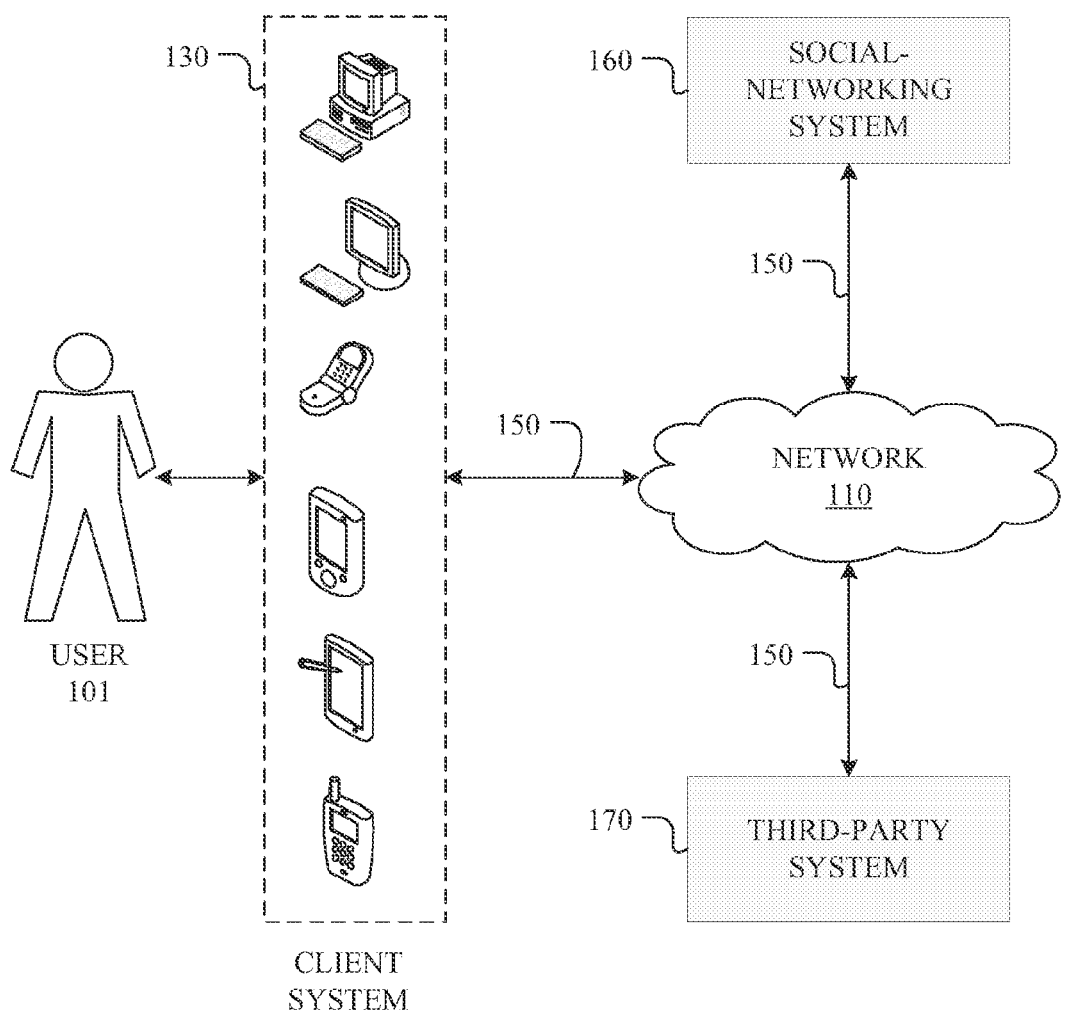
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various functions. Third-party system 170 may generate, store, receive, and transmit various types of data (e.g., data in connection with the functions hosted by third-party system 170). Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Social-networking system 160 may store various types of data. In particular embodiments, such data may be stored in a graph having any number of nodes and edges, where each edge connects two nodes. The graph is often referred to as a "social graph" as it contains, among others, social information.

Figure 2:
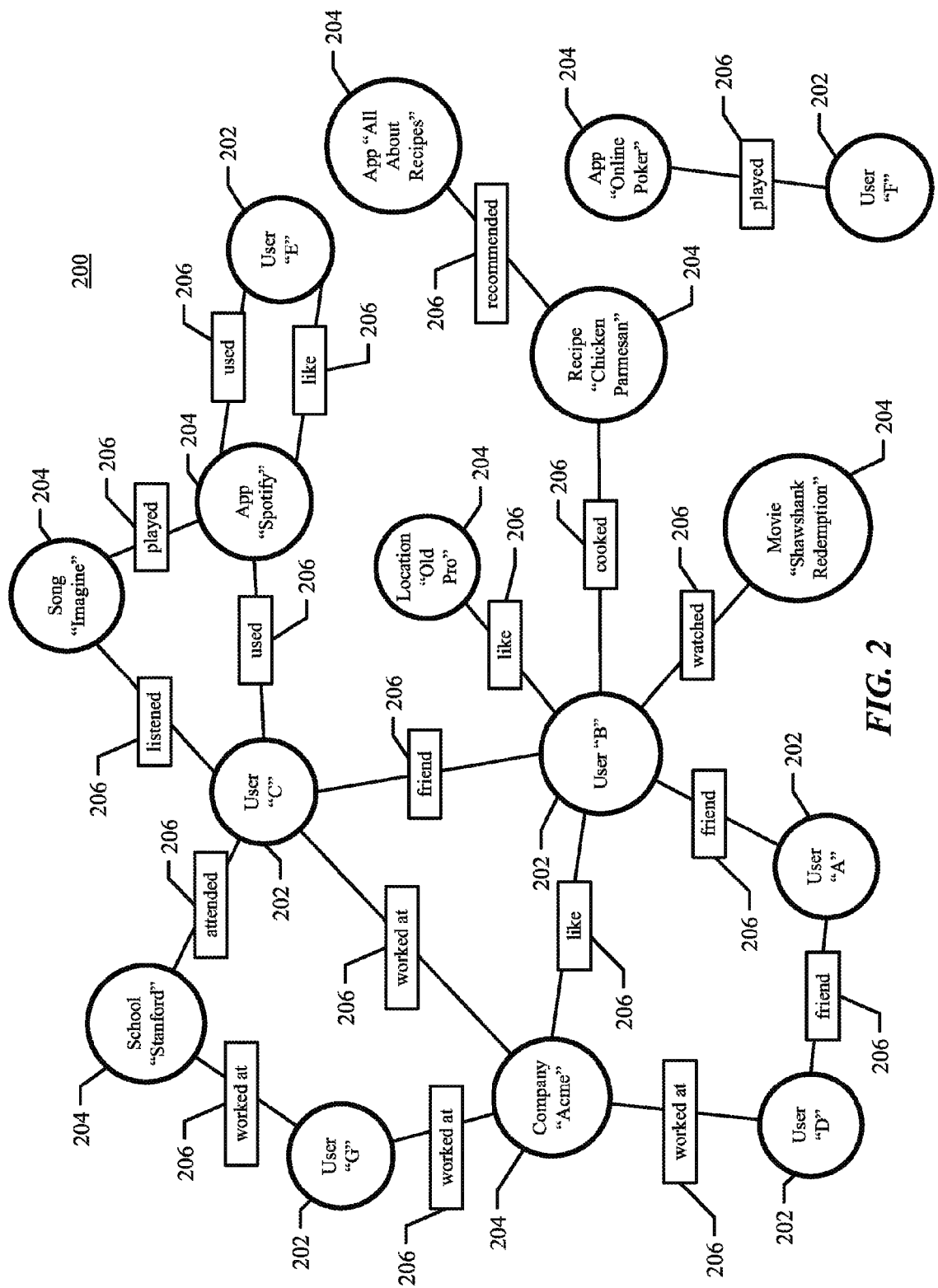
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages or one or more user-profile pages (which may be webpages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social-networking system 160 may implement and provide various functionalities, one of which may be a search tool for searching information available on the Internet, stored in social-networking system 160, or on a user's own electronic device.

A search tool, also referred to as a search engine at times, is a computer-implemented tool designed to search for information relevant to specific subject matters or topics. To conduct a search, a user may issue a search query to the search tool. The search query generally contains one or more words that describe a subject matter. In response, the search tool may identify one or more data items, often referred to as search results, that are likely to be related to the search query. Sophisticated search tools may implement other functionalities in addition to merely identifying the search results as a part of the search process. For example, a search tool usually ranks the identified search results according to their relative degrees of relevance with respect to the search query, such that the search results that are more relevant to the search query are ranked higher and consequently are presented to the user before the search results that are less relevant to the search query.

There are various searching and ranking algorithms that may be implemented in connection with a search tool. In particular embodiments, a searching and ranking algorithm may utilize a decision tree ensemble model, such as, for example, a random forest model. In the field of machine learning, a decision tree ensemble is an ensemble classifier that consists of a collection of decision trees.

Machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". Machine learning, in other words, is the process of training computers to learn to perform certain functionalities. Typically, an algorithm is designed and trained by applying the training data to the algorithm. The algorithm is adjusted (i.e., improved) based on how it responds to the training data.

A decision tree is a non-linear machine learning model that models a classification or regression problem as a series of binary "decisions" based on its input features that leads to a final result stored in the tree's leaf nodes. Typically, thresholds for making decisions are selected for continuous variables to form binary decisions at each decision node while values for categorical variables may be mapped to each branch. Examples of machine learning algorithms for learning decision trees include Iterative Dichotomiser 3 (ID3) and C4.5 algorithms.

Figure 3:
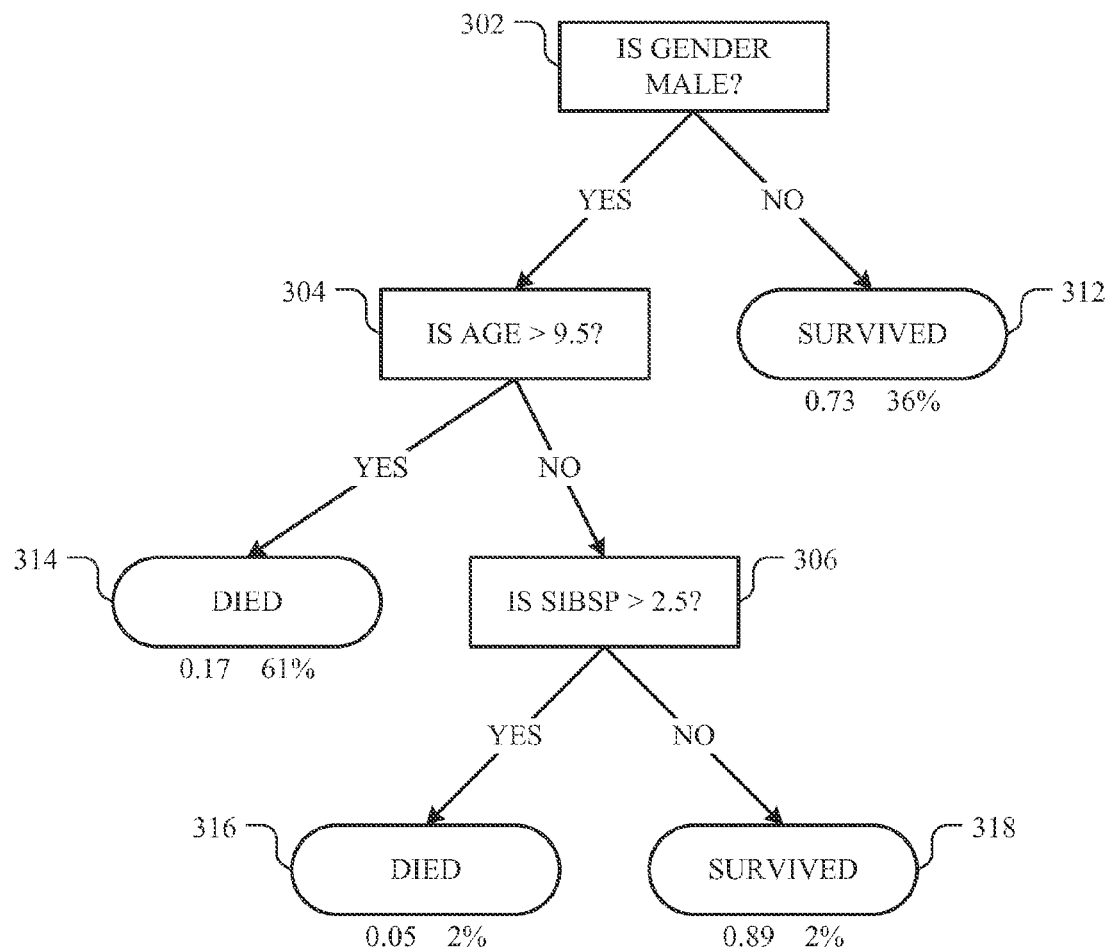
FIG. 3 illustrates an example decision tree.

FIG. 3 illustrates an example decision tree 300. A decision tree consists of three types of nodes: decision nodes, chance nodes, and end or leaf nodes. Decision tree 300 has three decision nodes, 302, 304, 306, corresponding to three input features. At decision node 302, if the "gender" feature is "male", the left branch is followed, and if the "gender" feature is "female", the right branch is followed. At decision node 304, if the "age" feature is greater than "9.5", the left branch is followed, and if the "age" feature is less than or equal to "9.5", the right branch is followed. At decision node 306, if the "sibsp" feature is greater than "2.5", the left branch is followed, and if the "sibsp" feature is less than or equal to "2.5", the right branch is followed. Decision tree 300 also has four end nodes, 312, 314, 316, 318. Each end node has a corresponding probability, indicating the likelihood that the end node may be reached. The sum of all the probabilities of all the end nodes should approximately equal to 100%. In addition, a decision tree may also indicate, for each decision node, the probability of each possible outcome of the decision. For example, in decision tree 300, for node 302, there are two possible outcomes of the decision (i.e., male or female). Decision tree 300 may indicate the probability that the gender is male and the probability that the gender is female. Similarly, for node 304, there are also two possible outcomes of the decision (i.e., >9.5 or <=9.5). Decision tree 300 may indicate the probability that the age is greater than 9.5 and the probability that the age is less than or equal to 9.5.

While decision trees have many appealing properties, one significant disadvantage is that they are often prone to over-fitting, leading to increased generalization error. To overcome this problem, many machine learning models apply ensemble methods, combining collections of decision tree models, referred to as decision tree ensembles, with bootstrap sampling and other elements of randomization to produce models with higher degrees of accuracy and precision. For example, one well-known ensemble method for decision trees is the random forest model, which may be used for regression-type and classification-type problems. A random forest is a collection of decision trees and outputs the class that is the mode of the classes output by the individual decision trees. Other examples of decision tree ensembles include bagging decision trees, boosted trees, and rotation forest. In statistics and machine learning, ensemble methods use multiple models to obtain better predictive performance than can be obtained from any of the constituent models. A machine learning ensemble refers to a concrete finite set of alternative models.

Note that search result ranking is merely one application for decision trees and decision tree ensembles. In practice, decision trees or decision tree ensembles may be utilized for many applications, such as data de-duplication, and this disclosure contemplates any applicable application for decision trees or decision tree ensembles.

While decision tree ensembles, such as random forests, are particularly accurate for many problems, one disadvantage is the computational cost to evaluate a prediction, since multiple trees each containing many nodes must be evaluated for every prediction. For example, as used with ranking algorithms, a typical decision tree ensemble may have as many as 45 decision trees, with 200-300 nodes contained in each tree, thus requiring in the order of hundreds of "decisions" to perform a single classification. In tasks where low latency per prediction is essential, such as search ranking, this computation cost can become a substantial problem. Furthermore, the nature of the computation performed on each decision branch lends itself to poor performance due to the high probability of branch mis-predictions, which incurs a severe high penalty on pipelined processors.

In particular embodiments, a decision tree may be evaluated in an interpreted mode. In this case, the decision tree is loaded into memory at runtime, and the evaluation process consists of executing a loop, starting from the root node and following the appropriate branches at the decision nodes, until a leaf node is reached for the decision tree. This process may be repeated for each decision tree in a decision tree ensemble. With some implementations, there may be an "interpreter", implemented as computer software, that performs the evaluation process (i.e., parsing and executing the loop for each decision tree).

Evaluating decision trees in the interpreted mode is relatively slow. To improve performance, in particular embodiments, a decision tree may be represented as software source code using an appropriate programming language (e.g., C or C++). The source code is then compiled into machine code using an appropriate compiler (e.g., C compiler). In this case, the machine code representing the decision tree is loaded into memory at runtime (e.g., as shared libraries), and the valuation process consists of executing the machine code. Again, each decision tree in a decision tree ensemble may be compiled into machine code for execution at runtime similarly.

Figure 4:
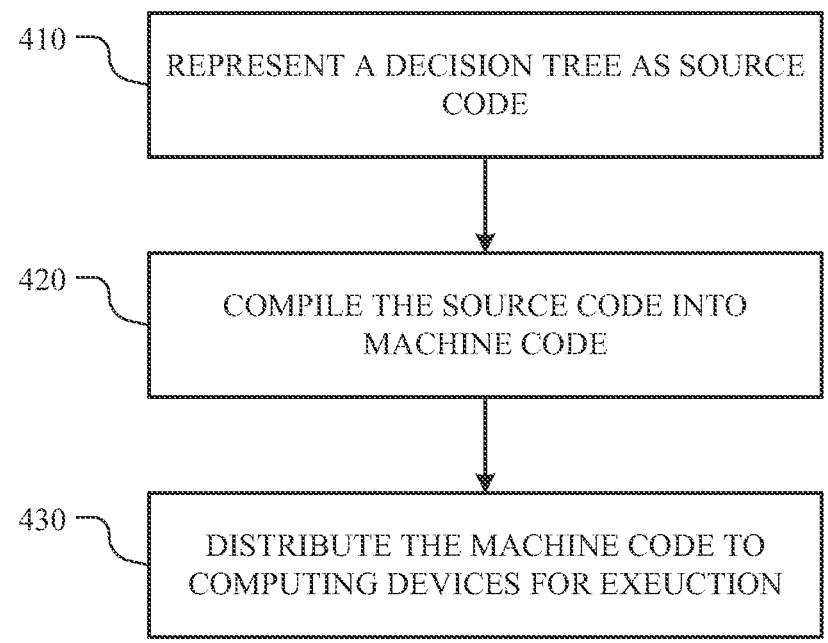
FIG. 4 illustrates an example method for offline compilation of a decision tree.

In particular embodiments, the compilation of decision trees in a decision tree ensemble into machine code may be performed prior to runtime (i.e., prior to the decision trees need to be evaluated, and thus offline). The machine code (e.g., shared libraries) may then be distributed to various computing devices for execution at runtime. This may be referred to as "offline" compilation. FIG. 4 illustrates an example method for offline compilation of a decision tree.

The method may begin at step 410, where a decision tree may be represented as software source code written in a suitable programming language. Since each decision node in the tree has a number of possible outcomes (e.g., two possible outcomes in the case of a binary decision node), each decision node and its possible outcomes may be represented as an "if-else" code block, which is available in almost all programming languages in one form or another. Consequently, a series of decision nodes may be represented as a series of "if-else" code blocks.

As an example, the following source code, written in C++, represents the example decision tree 300 illustrated in FIG. 3.

TABLE 1

```
1    double predict(double* ex) {
2      if (ex[FEATURE_GENDER] == MALE) {
3        goto node_304;
4      } else {
5        goto node_312;
6      }
7    node_304:
8      if (ex[FEATURE_AGE] > 9.5) {
9        goto node_314;
10     } else {
11       goto node_306;
12     }
13   node_312:
14     return 0.73;
15   node_314:
16     return 0.17;
17   node_306:
18     if (ex[FEATURE_SIBSP] > 2.5) {
19       goto node_316;
20     } else {
21       goto node_318;
22     }
23   node_316:
24     return 0.05;
25   node_318:
26     return 0.89;
27   }
```

For example, the code block at lines 2-6 of the source code corresponds to decision node 302. If the "gender" feature equals "male", the code proceeds to node 304; else (i.e., the "gender" feature does not equal "male"), the code proceeds to node 312. Similarly, the code block at lines 7-12 of the source code corresponds to decision node 304; and the code block at lines 17-22 of the source code corresponds to decision node 306. The code block at lines 13-14 of the source correspond to end node 312, which returns a result value (i.e., 0.73). Similarly, the code block at lines 15-16 of the source corresponds to end node 314; the code block at lines 23-24 of the source corresponds to end node 316; the code block at lines 25-26 of the source corresponds to end node 318.

Alternatively, instead of using the "goto" statement, as with the example source code illustrated in TABLE 1, nested "if-else" may be used, as illustrated with the example source code in TABLE 2.

TABLE 2

```
if (features[225] >= 4.0004) {
  if (features[242] >= 1.0001) {
    if (features[226] >= 35.0035) {
      return 0.666667;
    } else {
      if (features[49] >= 5.0005) {
        if (features[6] >= 999.9) {
          if (features[26] >= 1.0001) {
            return 0.8;
          } else {
          }
        } else {
        }
      }
    } else {
    }
  } else {
    if (features[63] >= 2.0002) {
      if (features[61] >= 0.0001) {
        if (features[225] >= 8.0008) {
          return 0.142857;
. . .
```

At step 420, the source code may be compiled into machine code using an appropriate compiler. For example, if the source code is written in C++, a C++ compiler may then be used to translate the source code into machine code.

Steps 410 and 420 may be similarly applied to each decision tree in a decision tree ensemble to generate source code representation for each decision tree and compile the source code of each decision tree into corresponding machine code. With some implementations, the machine code representing all the decision trees in a decision tree ensemble may form a shared object library.

At step 430, the machine code corresponding to the decision tree or trees (e.g., in the form of a shared object library) may be distributed to any number of computing devices for execution. At runtime, each computing device may load the machine code into memory and execute the machine code to evaluate the corresponding decision trees. Thus, evaluating a decision tree involves executing the machine code corresponding to that decision tree. For example, to evaluate decision tree 300 illustrated in FIG. 3, the function "predict" may be called, similar to calling any other functions written in C++.

Some compilers (e.g., gcc, a compiler system produced by the GNU project) are capable of applying numerous compile-time optimizations for basic source code blocks that lead to significantly faster and more efficient machine code (i.e., binary executables). For example, consider decision node 304. One way to represent this decision node in source code is:

TABLE 3A

```
if (ex[FEATURE_AGE] > 9.5) {
    goto node_314;
} else {
    goto node_306;
}
```

Another way to represent this same decision node in source code is:

TABLE 3B

```
if (ex[FEATURE_AGE] <= 9.5) {
    goto node_306;
} else {
    goto node_314;
}
```

Both source code representations illustrated in TABLES 3A and 3B produce the same result. However, in the first scenario illustrated in TABLE 3A, the left branch that leads to node 314 is tested first, and the right branch that leads to node 306 is tested only when the "if" statement "ex[FEATURE_AGE]>9.5" evaluates to false. On the other hand, in the second scenario illustrated in TABLE 3B, the right branch that leads to node 306 is tested first, and the left branch that leads to node 314 is tested only when the "if" statement "ex[FEATURE_AGE]<=9.5" evaluates to false.

In computer architecture, a branch predictor is a digital circuit that tries to guess which way a branch (e.g., an "if-else" structure) will go before it is known for sure. There are various implementations for branch prediction, including, for example, static prediction and next line prediction. The purpose of the branch predictor is to improve the flow in the instruction pipeline, and thus is crucial in pipelined microprocessors for achieving high performance. Two-way branching is usually implemented with a conditional jump instruction. A conditional jump can either be "not taken" and continue execution with the first branch of code which follows immediately after the conditional jump; or it can be "taken" and jump to a different place in program memory where the second branch of code is stored. It is not known for certain whether a conditional jump will be taken or not taken until the condition has been calculated and the conditional jump has passed the execution stage in the instruction pipeline.

Without branch prediction, the processor would have to wait until the conditional jump instruction has passed the execute stage before the next instruction can enter the fetch stage in the pipeline. The branch predictor attempts to avoid this waste of time by trying to guess whether the conditional jump is most likely to be taken or not taken. The branch that is guessed to be the most likely is then fetched and speculatively executed. If it is later detected that the guess was wrong then the speculatively executed or partially executed instructions are discarded and the pipeline starts over with the correct branch, incurring a delay. The time that is wasted in case of a branch mis-prediction is equal to the number of stages in the pipeline from the fetch stage to the execute stage. Modern microprocessors tend to have quite long pipelines so that the mis-prediction delay is between, for example, 10 and 20 clock cycles. The longer the pipeline the greater the need for a good branch predictor.

For the first time a conditional jump instruction is encountered, there is not much information on which to base a prediction. However, the branch predictor keeps records of whether branches are taken or not taken. When it encounters a conditional jump that has been seen several times before, the branch predictor can then base the prediction on the history. The branch predictor may, for example, recognize that the conditional jump is taken more often than not, or that it is taken every second time.

Consider the source code illustrated in TABLE 3A. Suppose that in practice, for the majority of the times the "if" statement "ex[FEATURE_AGE]>9.5" evaluates to true. In this case, the "else" part of the code does not need to be executed most of the times.

Conversely, suppose that in practice, for the majority of the times the "if" statement "ex[FEATURE_AGE]>9.5" evaluates to false. In this case, most of the times, the "if" statement needs to be evaluated, and followed by the "else" part of the code. Consequently, the source code illustrated in TABLE 3A is less efficient when the "if" statement "ex[FEATURE_AGE]>9.5" evaluates to false, since it results in both the "if" and the "else" parts of the code being executed.

When the "if" statement "ex[FEATURE_AGE]>9.5" evaluates to false, it means that the "if" statement "ex[FEATURE_AGE]<=9.5" evaluates to true. Therefore, when the "if" statement "ex[FEATURE_AGE]>9.5" evaluates to false most of times, it means that the "if" statement "ex[FEATURE_AGE]<=9.5" evaluates to true most of times. The source code illustrated in TABLE 3B is more efficient in this case, since the "else" part of the code does not need to be executed most of the times.

Based on this reasoning, if it is known ahead of time (e.g., before source code or machine code generation) to which branch of a decision node the code proceeds for the majority of the times, the code may be adjusted (i.e., rewritten) so that it is executed more efficiently and thus optimized. With the above example, when the left branch of decision node 304 is taken most of the times, the source code illustrated in TABLE 3A is more preferable as it is more efficient and optimized. In contrast, when the right branch of decision node 304 is taken most of the times, the source code illustrated in TABLE 3B is more preferable as it is more efficient and optimized.

Distributing shared object libraries can often be inconvenient in a heterogeneous production environment as differences in compiler versions, architectures, and environments can cause incompatibilities. In particular embodiments, a just-in-time compiler for decision tree ensembles is developed, where the compilation of the model (e.g., decision trees) may take place within the functional component rather than as a separate step. This also enables additional optimizations, which can occur by accounting for differences between the training distribution and the distribution of examples for which predictions are queried. Since processors generally perform better when executing sequential instructions, given a conditional branch (e.g., an "if-else" statement), knowing which branch will most likely to be the one taken allows the compiler to optimize the likelihood of instructions appearing sequentially.

Figure 5:
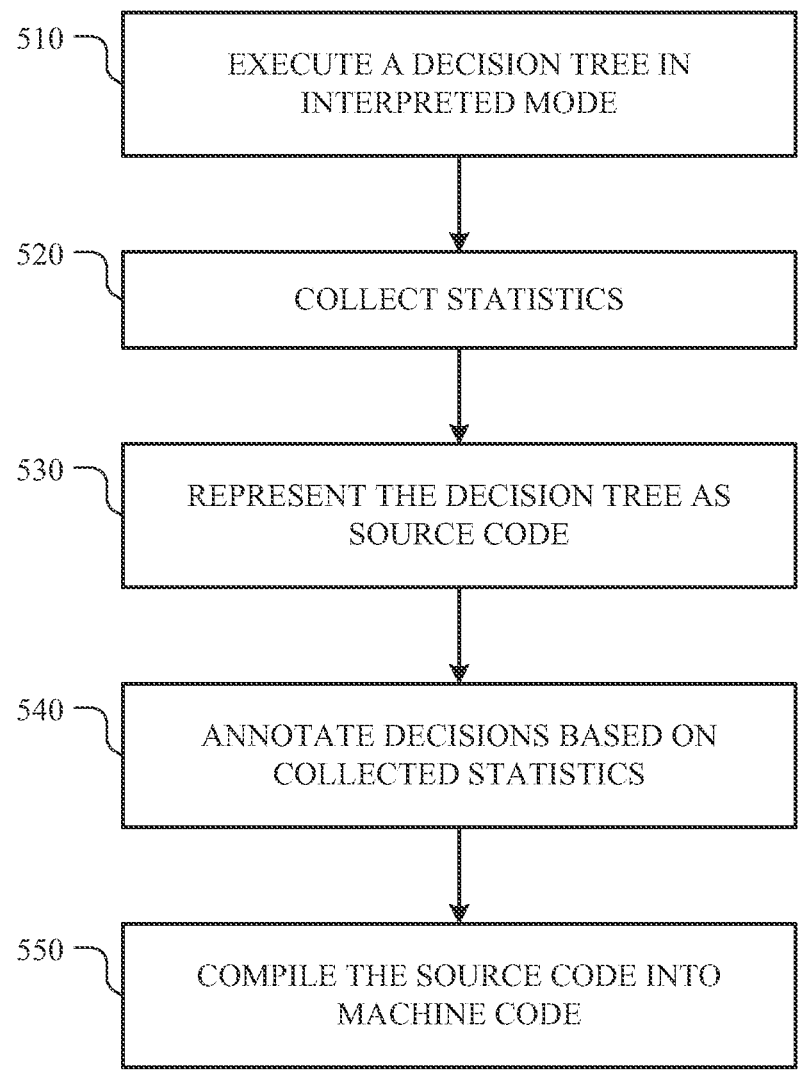
FIG. 5 illustrates an example method for just-in-time compilation of a decision tree.

FIG. 5 illustrates an example method for just-in-time compilation of a decision tree. Again, the steps of FIG. 5 may be similarly applied to each decision tree in a decision tree ensemble. Instead of distributing machine code to the computing devices, in particular embodiments, a decision tree ensemble itself may be distributed to various computing devices. The method of FIG. 5 may begin at step 510, where each decision tree in a decision tree ensemble may be evaluated in the interpreted mode at a specific computing device. With some implementations, to evaluate a decision tree in interpreted mode, the decision tree is loaded into memory at runtime and evaluated with an interpreter. In this way, a decision tree ensemble may also be evaluated in the interpreted mode, where the decision tree ensemble (i.e., all the decision trees in the decision tree ensemble) is loaded into memory at runtime and evaluated with an interpreter.

At step 520, while each decision tree is evaluated in the interpreted mode, statistics may be collected for each decision node in the decision tree. With some implementations, a decision tree may be evaluated in the interpreted mode for $n_s$ times (e.g., $n_s$=100,000). During these evaluations, for each decision node in the tree, the number of times each branch of the decision node is actually taken (i.e., realized) may be recorded. This in turn indicates which branch of the decision node is taken for the majority of the times, as well as which branch is not taken for the majority of the times.

At step 530, after the decision tree has been evaluated in the interpreted mode for $n_s$ times and sufficient statistics have been collected for the decision nodes in the tree, source code may be generated for the decision tree. As described above, each decision node and its branches in the decision tree may be represented as an "if-else" code block, and a series of decision nodes may be represented as a series of "if-else" code blocks.

In addition, in particular embodiments, at step 540, each decision node (i.e., "if-else" code block) may be annotated with instructions that enable the computer to optimally arrange the code based on the taken vs. not-taken probabilities for the individual branches of the decision node as indicated by the collected statistics. With some implementations, given a decision node, the branch of the node that is taken more often should be placed before the branch of the node that is taken less often. This way, the branch of the decision node that is taken more often is tested first during execution of the corresponding machine code.

The following illustrates an example C++ source code annotated with branch probability hints.

TABLE 4

```
double evaluate_tree1(const double* features) {
   if (_builtin_expect(features[23] >= 0.0001, 0)) { // 0.98984
      if (_builtin_expect(features[69] >= 0.0322758, 0)) { //
0.693921
         return 1;
      } else {
         if (_builtin_expect(features[13] >= 18.9981, 1)) { //
0.773468
            return 0;
         } else {
            return 1;
         }
      }
   } else {
      if (_builtin_expect(features[51] >= 10480, 0)) { //
0.914976
         if (_builtin_expect(features[33] >= 28959.1, 0)) { //
0.891396
            if (_builtin_expect(features[53] >= 327.033, 1)) { //
0.607371
               if (_builtin_expect(features[8] >= 1.0001, 0)) { //
0.715018
```

After each "if" statement, there is a probability value, taken the form of a comment (i.e., following "//"), that indicates the likelihood that the corresponding "if" statement evaluates to true during execution, as indicated by the collected statistics.

At step 550, the annotated source code may be compiled into machine code for execution. The compiler (e.g., the just-in-time compiler) may use the probability value associated with each "if" statement to determine the optimal arrangement of the code. For example, an "if" statement with a higher probably value may be placed before an "if" statement with a lower probably value, while maintaining the correct logic of the code.

In particular embodiments, the compiled decision trees allow for each conditional branch in the decision trees to be represented as a separate jump instruction. This allows for more optimal execution for processors with adaptive branch predictors. When executing the decision tree ensemble (e.g., random forest) in the interpreted mode, the jump instruction for the loop is shared by all branches in the tree. This only allows the branch predictor to optimize the average cases (i.e., whether most of the branches tend to go left or go right), but not optimize each branch individually.

Note that passing the probability values of the "if" statements (e.g., as comments in the source code) to a special compiler (e.g., the just-in-time compiler) so that the compiler may use these probability values to optimized the compiled code is just one way for optimizing decision trees during compilation. This disclosure contemplates any suitable means for optimizing decision trees during compilation.

In particular embodiments, the compiled machine code may be verified against the corresponding decision tree. Each decision tree in the decision tree ensemble may be evaluated twice at the same time. On the one hand, a decision tree may be evaluated in the interpreted mode. On the other hand, the decision tree may also be evaluated by executing the machine code corresponding to the decision tree. The two evaluation results may be compared. If the result obtained by executing the corresponding machine code agrees with the result obtained by evaluating the decision tree in the interpreted mode, this indicates that the machine code functions correctly. Otherwise, the machine code may have errors.

With some implementations, the verification may be done $n_c$ times (e.g., $n_c$=10,000) for each decision tree. That is, for each decision tree in the decision tree ensemble, the decision tree may be evaluated both in the interpreted mode and by executing the corresponding machine code for $n_c$ times and the two results obtained for each time are compared. If the verification indicates that the machine code functions correctly, the machine code may replace the decision tree evaluated in the interpreted mode. Thereafter, the decision tree may only need to be evaluated by executing the corresponding machine code. Otherwise, the decision tree may continue to be evaluated in the interpreted mode and the erroneous machine code may be discarded.

With some implementations, evaluating the decision trees in the interpreted mode may be a fallback position. For example, if any step in FIG. 5 has problems, the evaluation of the decision trees may always fall back to the interpreted mode, at least until the problems are resolved and the machine code is verified to function correctly.

Although this disclosure describes and illustrates particular steps of the methods of FIGS. 4 and 5 as occurring in a particular order, this disclosure contemplates any suitable steps of the methods of FIGS. 4 and 5 occurring in any suitable order. Moreover, although this disclosure describes and illustrates particular components, devices, or systems carrying out particular steps of the methods of FIGS. 4 and 5, this disclosure contemplates any suitable combination of any suitable components, devices, or systems carrying out any suitable steps of the methods of FIGS. 4 and 5.

Figure 6:
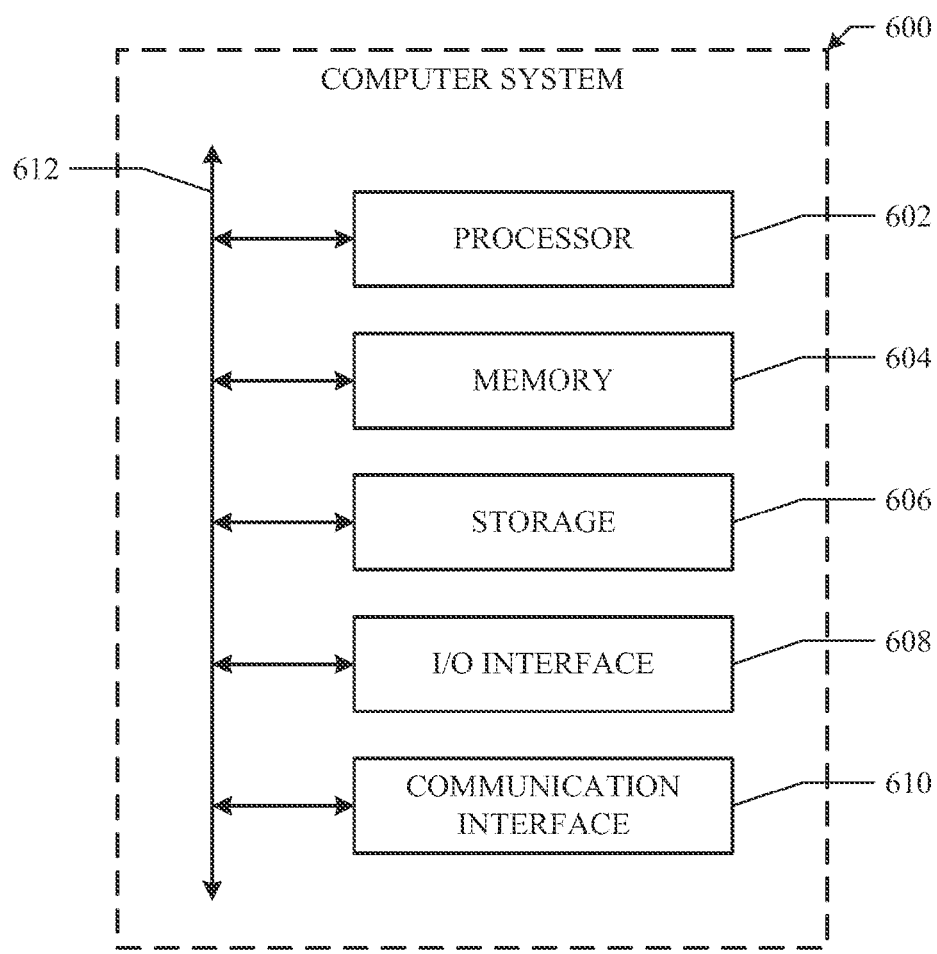
FIG. 6 illustrates an example computer system.

FIG. 6 illustrates an example computer system 600. With some implementations, computer system 600 may compile decision tree ensembles or evaluate decision tree ensembles in the interpreted mode or by executing corresponding machine code. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    evaluating a decision tree in interpreted mode;

modifying the decision tree by annotating each decision in the decision tree with instructions determined based on statistics collected during evaluation of the decision tree;
generating an executable version of the decision tree, the executable version comprising executable code optimized based on the instructions;
executing the executable code; and
verifying the executable code by comparing a result of executing the executable code with a result of evaluating the decision tree in interpreted mode.

2. The method of claim 1, wherein the modifying is performed by a first computing device and the executable code is generated by a second computing device, further comprising:
sending, by the first computing device, the modified decision tree to the second computing device.

3. The method of claim 1, wherein the generating comprises:
compiling the modified decision tree into machine code, wherein the executable code comprises the machine code.

4. The method of claim 3, wherein the compiling the modified decision tree into machine code is performed dynamically at the time the decision tree is used.

5. The method of claim 3, wherein each conditional branch in the decision tree is represented as a separate jump instruction.

6. The method of claim 1, further comprising:
evaluating an original version of the decision tree in interpreted mode; and
collecting the statistics while the decision tree is evaluated in interpreted mode.

7. The method of claim 6, wherein the collected statistics comprise, for each decision in the decision tree having a plurality of possible outcomes, a probability that each possible outcome of the decision is actually realized while the decision tree is evaluated in interpreted mode.

8. The method of claim 7, wherein optimizing the executable code comprises:
for each decision in the decision tree, ordering the executable code representing the plurality of possible outcomes of the decision based on the total number of times each possible outcome of the decision is actually realized while the decision tree is evaluated in interpreted mode.

9. The method of claim 6, further comprising:
executing the executable code in place of evaluating the decision tree in interpreted mode.

10. The method of claim 1, wherein:
the decision tree is a part of a decision tree ensemble comprising a plurality of decision trees; and
each decision tree in the decision tree ensemble is represented as executable code.

11. The method of claim 10, further comprising:
ranking a set of search results by executing the executable code representing one or more decision trees in the decision tree ensemble.

12. One or more computer-readable non-transitory storage media embodying software that is operable when executed by one or more processors to:
evaluate a decision tree in interpreted mode;
modify the decision tree by annotating each decision in the decision tree with instructions determined based on statistics collected during evaluation of the decision tree;
generate an executable version of the decision tree, the executable version comprising executable code optimized based on the instructions;
execute the executable code; and
verify the executable code by comparing a result of executing the executable code with a result of evaluating the decision tree in interpreted mode.

13. The media of claim 12, wherein the modifying is performed by a first computing device and the executable code is generated by a second computing device, further comprising:
sending, by the first computing device, the modified decision tree to the second computing device.

14. The media of claim 12, wherein the generating comprises:
compiling the modified decision tree into machine code, wherein the executable code comprises the machine code.

15. The media of claim 14, wherein the compiling the modified decision tree into machine code is performed dynamically at the time the decision tree is used.

16. The media of claim 14, wherein each conditional branch in the decision tree is represented as a separate jump instruction.

17. The media of claim 12, wherein the software is further operable when executed by the one or more processors to:
evaluate an original version of the decision tree in interpreted mode; and
collect the statistics while the decision tree is evaluated in interpreted mode.

18. The media of claim 17, wherein the collected statistics comprise, for each decision in the decision tree having a plurality of possible outcomes, a probability that each possible outcome of the decision is actually realized while the decision tree is evaluated in interpreted mode.

19. The media of claim 18, wherein optimizing the executable code comprises:
for each decision in the decision tree, ordering the executable code representing the plurality of possible outcomes of the decision based on the total number of times each possible outcome of the decision is actually realized while the decision tree is evaluated in interpreted mode.

20. The media of claim 17, wherein the software is further operable when executed by the one or more processors to:
execute the executable code in place of evaluating the decision tree in interpreted mode.

21. The media of claim 12, wherein:
the decision tree is a part of a decision tree ensemble comprising a plurality of decision trees; and
each decision tree in the decision tree ensemble is represented as executable code.

22. The media of claim 21, wherein the software is further operable when executed by the one or more processors to:
rank a set of search results by executing the executable code representing one or more decision trees in the decision tree ensemble.

23. A system comprising:
one or more processors; and
a memory coupled to the processors comprising instructions executable by the processors, the processors being operable when executing the instructions to:
evaluate a decision tree in interpreted mode;
modify the decision tree by annotating each decision in the decision tree with instructions determined based on statistics collected during evaluation of the decision tree;

generate an executable version of the decision tree, the executable version comprising executable code optimized based on the instructions;
execute the executable code; and
verify the executable code by comparing a result of executing the executable code with a result of evaluating the decision tree in interpreted mode.

24. The system of claim 23, wherein the modifying is performed by a first computing device and the executable code is generated by a second computing device, further comprising:
sending, by the first computing device, the modified decision tree to the second computing device.

25. The system of claim 23, wherein the generating comprises:
compiling the modified decision tree into machine code, wherein the executable code comprises the machine code.

26. The system of claim 25, wherein the compiling the modified decision tree into machine code is performed dynamically at the time the decision tree is used.

27. The system of claim 25, wherein each conditional branch in the decision tree is represented as a separate jump instruction.

28. The system of claim 23, wherein the processors are further operable when executing the instructions to:
evaluate an original version of the decision tree in interpreted mode; and
collect the statistics while the decision tree is evaluated in interpreted mode.

29. The system of claim 28, wherein the collected statistics comprise, for each decision in the decision tree having a plurality of possible outcomes, a probability that each possible outcome of the decision is actually realized while the decision tree is evaluated in interpreted mode.

30. The system of claim 29, wherein optimizing the executable code comprises:
for each decision in the decision tree, ordering the executable code representing the plurality of possible outcomes of the decision based on the total number of times each possible outcome of the decision is actually realized while the decision tree is evaluated in interpreted mode.

31. The system of claim 28, wherein the processors are further operable when executing the instructions to:
execute the executable code in place of evaluating the decision tree in interpreted mode.

32. The system of claim 23, wherein:
the decision tree is a part of a decision tree ensemble comprising a plurality of decision trees; and
each decision tree in the decision tree ensemble is represented as executable code.

33. The system of claim 32, wherein the software is further operable when executed by the one or more processors to:
rank a set of search results by executing the executable code representing one or more decision trees in the decision tree ensemble.

\* \* \* \* \*